(12) United States Patent
Noda et al.

(10) Patent No.: US 6,370,015 B2
(45) Date of Patent: Apr. 9, 2002

(54) LAMINATED CERAMIC ELECTRONIC DEVICE

(75) Inventors: Satoru Noda, Hikone; Kunihiko Hamada, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/800,991

(22) Filed: Mar. 7, 2001

(30) Foreign Application Priority Data

Mar. 17, 2000 (JP) ........................................ 2000-076283

(51) Int. Cl.$^7$ ............................. H01G 4/06; H01G 4/008
(52) U.S. Cl. .................. 361/321.2; 361/305; 361/321.5
(58) Field of Search .................................. 361/303, 305, 361/306.3, 308.1, 309, 310, 321.1, 321.2, 321.4, 321.5, 322

(56) References Cited

U.S. PATENT DOCUMENTS 3,902,102 A  8/1975  Burn
4,687,540 A  * 8/1987  Singhdeo et al.

FOREIGN PATENT DOCUMENTS

JP    58-14600    3/1983
JP    4-15606     3/1992

* cited by examiner

*Primary Examiner*—Anthony Dinkins
(74) *Attorney, Agent, or Firm*—Ostrolenk, Faber, Gerb & Soffen, LLP

(57) ABSTRACT

A laminated ceramic capacitor is provided having superior elastic and bending characteristics and having a high mechanical strength withstanding the thermal shock generated when mounting is performed on a circuit substrate by soldering. The laminated ceramic capacitor is composed of a laminate and external electrodes, wherein the laminate is formed of a plurality of ceramic layers and a plurality of internal electrodes provided therebetween so that an end of each internal electrode is exposed at one of edge surfaces of the laminate, and the external electrodes are connected to the internal electrodes and contains a conductive component and a glass having a Young's modulus of about $9 \times 10^9$ Pa or less.

20 Claims, 1 Drawing Sheet

LAMINATED CERAMIC ELECTRONIC DEVICE

BACKGROUND OF THE INVENTION

1. Field of the Invention

The present invention relates to laminated ceramic electronic devices, and more particularly, to a laminated ceramic capacitor having a superior resistance to the expansion and contraction of a circuit board and having superior resistance to bending thereof.

2. Description of the Related Art

A typical laminated ceramic capacitor is composed of a ceramic laminate having internal electrodes therein, and external electrodes. The ceramic laminate is formed by baking a green ceramic laminate composed of a plurality of green ceramic layers, which are formed of a dielectric material, and internal electrodes provided between the ceramic layers. The internal electrodes are formed by steps of printing a conductive paste on a plurality of green ceramic layers and baking the conductive paste printed on the plurality of green ceramic layers constituting the green ceramic laminate. Each internal electrode is formed so that an end thereof is exposed at one of edge surfaces of the ceramic layer. The external electrodes are formed by the step of coating a conductive paste on edge surfaces of the ceramic laminate so as to be connected to the ends of the internal electrodes exposed at the edge surfaces of the ceramic laminate, and the step of baking the conductive paste.

The conductive paste for forming external electrodes is primarily composed of a conductive component, an inorganic binder and an organic vehicle. In particular, in the case in which a base metal, such as copper (Cu) or nickel (Ni), is used as the conductive component, baking is performed in a nitrogen ($N_2$) atmosphere in order to prevent the conductive component from being oxidized. As an inorganic binder used when baking is performed in a $N_2$ atmosphere, a barium oxide (BaO)-based glass is disclosed in Japanese Examined Utility Model Application Publication No. 58-14600, and a zinc oxide (ZnO)-based glass is disclosed in Japanese Examined Patent Application Publication No. 4-15606.

A conductive paste using the glass mentioned above as an inorganic binder can be baked in a $N_2$ atmosphere; however, the adhesive strength of the conductive paste to a ceramic body is low. Accordingly, in the case in which a laminated ceramic capacitor having external electrodes formed of the conductive paste described above, is mounted on a circuit board, when the ambient temperature abruptly changes or when a thermal shock is applied to the laminated ceramic capacitor, cracking may occur inside the laminated ceramic capacitor in some cases due to the stress generated by expansion and contraction of the circuit board and/or the stress generated by bending of the circuit board caused by an external force. In recent years, concomitant with the trend toward thinner capacitors approximately 0.3 to 2.0 mm thick, the thicknesses of ceramic layers have decreased to approximately several to 30 mm, and the thicknesses of internal electrodes have decreased to approximately 0.5 to 2.0 µm. For the laminated ceramic capacitor described above, the occurrence of internal cracks will result in catastrophic failure.

SUMMARY OF THE INVENTION

In consideration of the problem described above, an object of the present invention is to provide a laminated ceramic electronic device having a superior resistance to the expansion and contraction of a circuit board and having superior resistance to bending thereof. In particular, the laminated ceramic electronic device of the present invention has a mechanical strength withstanding the stress generated by expansion and contraction of the circuit board caused by a thermal shock when mounting is performed thereon and withstanding the stress generated by bending of the circuit board caused by an external force applied thereto.

To this end, the laminated ceramic electronic device of the present invention comprises a plurality of ceramic layers, a plurality of internal electrodes formed between the ceramic layers, and external electrodes connected to the internal electrodes, wherein the external electrode contains a conductive component and an inorganic binder having a Young's modulus of about $9.0 \times 10^9$ Pa or less.

DESCRIPTION OF THE PREFERRED EMBODIMENTS

Figure 1:
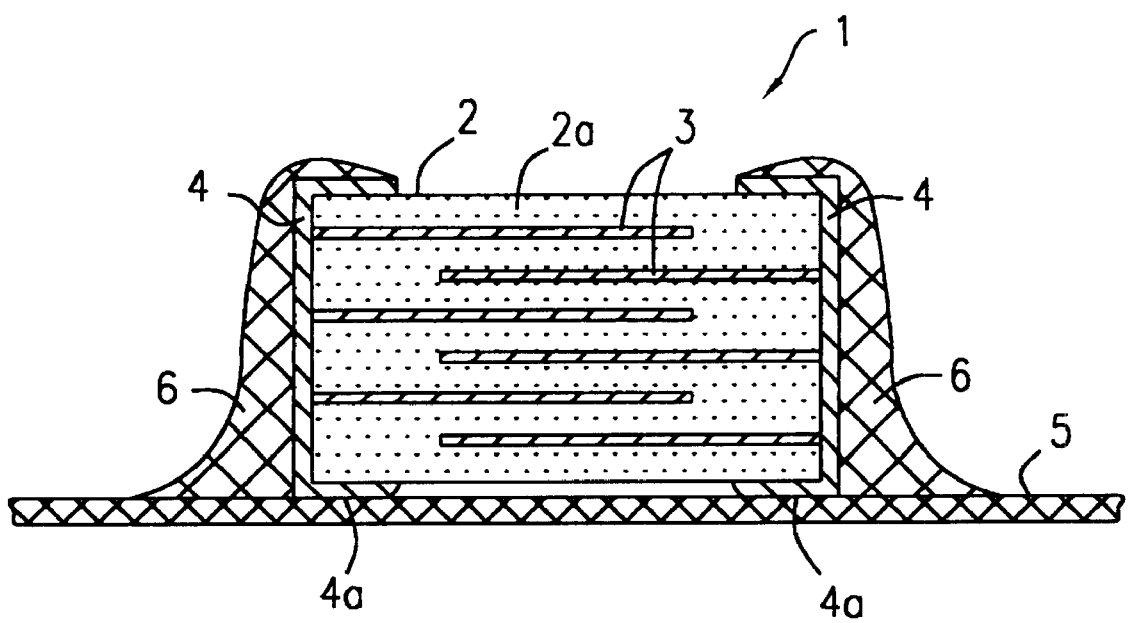
FIG. 1 is a cross-sectional view of a laminated ceramic capacitor according to an embodiment of the present invention.

The glasses shown in Table 1 may be mentioned as a possible inorganic binder applicable to a conductive paste which is used for forming an external electrode. However, the present invention is characterized in that an alkali silicate glass or a phosphate glass, which has a low Young's modulus, is used as the inorganic binder of a conductive paste for forming an external electrode.

TABLE 1

| Type of Glass | Young's Modulus × $10^9$ (Pa) |
| --- | --- |
| Silica | ≧52.0 |
| Alkali Silicate | ≧6.3 |
| Alkaline Earth Silicate | ≧19.0 |
| Lead Silicate | ≧41.2 |
| Borosilicate | ≧9.6 |
| Zinc Silicate | ≧46.1 |
| Aluminosilicate | ≧9.7 |
| Fluorosilicate | ≧67.0 |
| Other Silicate | ≧22.0 |
| Borate | ≧15.1 |
| Phosphate | ≧1.4 |
| Fluorophosphate | ≧47.0 |
| Lead Aluminate | ≧28.1 |
| Aluminate | ≧79.3 |
| Germanate | ≧32.9 |
| Oxynitride | ≧14.3 |
| Other oxide | ≧11.9 |
| Calcogenide | ≧9.5 |
| Galide | ≧38.0 |
| Halide | ≧11.7 |

By using a glass having a Young's modulus of about $9.0 \times 10^9$ Pa or less, and more preferably, of about $6.3 \times 10^9$ Pa or less, as the inorganic binder contained in the external electrode, a laminated ceramic electronic device can be obtained which can satisfactory withstand a thermal shock when the laminated ceramic electronic device is soldered to a mother substrate or the like, which has superior bending and elastic characteristics and which has a high mechanical strength.

When the conductive component is a base metal, such as Ni or Cu, the baking is performed in a non-oxidizing atmosphere. In the case described above, when the inorganic binder is at least one of an alkali silicate glass and a phosphate glass, the inorganic binder is sufficiently softened to flow so as to promote the sintering of the conductive component while the functions of the binder are maintained, and as a result, the adhesive strength of the external electrode can be sufficiently improved.

When the inorganic binder is an alkali silicate glass, the glass may contain $Al_2O_3$ in addition to the silicon and an alkali metal component, such as sodium (Na) or lithium (Li). When the inorganic binder is a phosphate glass, this glass may contain $Al_2O_3$ and/or an alkali metal oxide in addition to the phosphorus.

In this connection, the conductive component is not specifically limited to a base metal, such as Ni or Cu, and to an alloy thereof, and for example, a noble metal, such as silver (Ag) or palladium (Pd), may be used.

The glass described above may contain substantially no alkaline earth metal oxide and no zinc oxide. The Young's modulus of a glass containing an alkaline earth metal oxide or zinc oxide tends to increase. In addition, from the standpoint of environmental conservation, it is preferable that lead oxides or the like, which burden the environment, not be contained in the glass.

In addition, preferably, about 2 to 50 parts by weight, and more preferably, about 4 to 20 parts by weight of the inorganic binder described above is present with respect to 100 parts by weight of the conductive component described above. When the content of the inorganic binder is increased beyond than that described above, the conductivity may be decreased in some cases, and in contrast, when the content of the inorganic binder is decreased to less than that described above, the functions as the binder described above may not be fully realized in some cases.

Next, the laminated ceramic electronic device of the present invention will be described by using a laminated ceramic capacitor as an example.

As shown in FIG. 1, a laminated ceramic capacitor 1 is primarily composed of a ceramic laminate 2 and external electrodes 4 connected to internal electrodes 3, wherein the ceramic laminate 2 is formed of a plurality of ceramic layers 2a and a plurality of internal electrodes 3 provided therebetween.

The ceramic laminate 2 is formed by steps of laminating green ceramic sheets formed of a dielectric material primarily composed of, for example, $BaTiO_3$, dispersed in a vehicle, in which printed conductive pastes are provided between the green ceramic sheets, and baking the green ceramic laminate thus formed.

The internal electrodes 3 are provided between the ceramic layers 2a constituting the ceramic laminate 2, each internal electrode 3 being formed so that an end thereof is exposed at one of the edge surfaces of the ceramic laminate 2. The internal electrodes 3 are formed by steps of printing a conductive paste on green ceramic sheets and baking the conductive paste printed on the ceramic green sheets constituting the green ceramic laminate.

The external electrodes 4 are connected to the internal electrodes 3 at the ends thereof which are exposed at the edge surfaces of the ceramic laminate 2 and are formed by coating a conductive paste on the edge surfaces of the ceramic laminate 2 followed by baking.

In the embodiment described above, $BaTiO_3$ is used as a material for forming the ceramic layer 2a; however, the present invention is not limited thereto, and for example, $PbTiO_3$, or $PbZrO_3$ may be optionally used.

In addition, the number of the internal electrodes 3 to be formed and the number of the internal electrodes 3 to be electrically and mechanically connected to the external electrodes 4 are not limited to the embodiment shown in FIG. 1, and internal electrodes may be provided which are not exposed at the edge surfaces of the ceramic laminate 2.

Since the laminated ceramic capacitor is provided with the external electrodes 4 having the structure described above, in particular, even when the laminated ceramic capacitor 1 is very compact and thin having a thickness of about 0.15 to 2 mm, in which each ceramic layer 2a has a thickness of about 40 μm or less, and each internal electrode 3 has a thickness of about 3.0 μm or less, the laminated ceramic capacitor 1 can satisfactory withstand thermal shock during soldering, has superior bending and elastic characteristics, and has a high mechanical strength.

EXAMPLES

A powdered ceramic primarily composed of $BaTiO_3$, a binder and a plasticizer were first prepared, and these materials were uniformly mixed together by using a ball mill, whereby a ceramic slurry was prepared. Subsequently, green ceramic sheets were formed by the doctor blade method using the ceramic slurry thus prepared. A conductive paste containing Ni as a conductive component was then coated on predetermined green ceramic sheets so as to form electrode films, and a plurality of green ceramic laminates were subsequently formed by laminating the green ceramic sheets provided with the electrode films and ceramic green sheets provided with no electrode films. Next, the plurality of green ceramic laminates was baked at 1,300° C. in a $N_2$ atmosphere, thereby forming a plurality of ceramic laminates.

Next, 4.5 parts by weight of a glass frit shown in Table 2, 25.5 parts by weight of an organic vehicle composed of ethyl cellulose, butyl carbitol and terpineol, and 70 parts by weight of powdered Cu were prepared, and they were mixed and kneaded, thereby yielding a conductive paste. In this manner, conductive pastes of examples 1 to 4 and conductive pastes of comparative examples 1 to 4 were formed.

The conductive pastes of the examples 1 to 4 and of the comparative examples 1 to 4 were then coated on two opposing edge surfaces of the corresponding ceramic laminates by immersion, and overlapped somewhat the ends of the sides connecting the opposing surfaces, as shown at 4a. The resulting ceramic laminates provided with the conductive pastes were dried at 150° C. for 10 minutes and were then baked at a maximum temperature of 600° C. for 10 minutes in a $N_2$ atmosphere, whereby ceramic laminates were obtained, each of which had a pair of external electrodes connected to the internal electrodes.

Next, Ni plating films were formed on the pair of external electrodes by electroplating, and subsequently, Sn plating films were formed on the Ni plating films by electroplating, whereby a laminated ceramic capacitor was formed. The Ni and Sn combination is generally shown in the figure as 6. In this manner, laminated ceramic capacitors of the examples 1 to 4 and laminated ceramic capacitors of the comparative examples 1 to 4 were formed.

A lead wire was soldered to the external electrode of each laminated ceramic capacitor thus formed, whereby samples of the examples 1 to 4 and samples of the comparative examples 1 to 4 were prepared for measuring tensile strength. In this measurement, the lead wire soldered to the external electrode was pulled at a speed of 100 mm/minute, and the tensile strength of the external electrode was determined by a load at which the external electrode separated from the ceramic laminate at the interface therebetween. The results are shown in Table 2.

In addition, the laminated ceramic capacitors of the examples 1 to 4 and of the comparative examples 1 to 4 were respectively mounted by using a Sn/Pb eutectic solder on lands located at the central portions of glass reinforced epoxy substrates 5, which were 100 mm long, 40 mm wide and 1.6 mm thick, whereby samples of the examples 1 to 4 and samples of the comparative examples 1 to 4 were prepared for measuring bending strengths. The bending strengths of the samples of the example 1 to 4 and of the comparative examples 1 to 4 were measured, and the results are shown in Table 2. The bending strength was measured in accordance with a method defined by Electronic Industries Association of Japan (EIAJ). That is, the two ends of the glass reinforced epoxy substrate were fixed, the glass reinforced epoxy substrate was then bent by pressing at the central portion of the rear surface thereof using a pressing bar in the direction toward the front surface, and the bending strength was reported as the distance that the pressing bar moved from the start to a position at which cracking occurred in the laminated ceramic capacitor mounted on the glass reinforced epoxy substrate.

TABLE 2

| SAMPLE | TYPE OF GLASS | MAJOR OXIDES (mol %) (RATIO OF THREE COMPONENTS) | TENSILE STRENGTH (N) | BINDING STRENGTH (mm) |
|---|---|---|---|---|
| EXAMPLES | | | | |
| 1 | ALKALI SILICATE | $85SiO_2$—$13.5Na_2O$—$1.5Al_2O_3$ | 21.0 | 4.01 |
| 2 | ALKALI SILICATE | $70SiO_2$—$25Na_2O$—$5Al_2O_3$ | 20.5 | 3.92 |
| 3 | PHOSPHATE | $70P_2O_5$—$15Al_2O_3$—$15Li_2O_3$ | 16.0 | 3.96 |
| 4 | PHOSPHATE | $60P_2O_5$—$20Al_2O_3$—$20Li_2O_3$ | 18.6 | 3.88 |
| COMPARATIVE EXAMPLES | | | | |
| 1 | BARIUM BOROSILICATE | $50B_2O_3$—$20SiO_2$—$30BaO$ | 12.6 | 2.16 |
| 2 | BARIUM BOROSILICATE | $30B_2O_3$—$30SiO_2$—$40BaO$ | 15.0 | 1.89 |
| 3 | ZINC BOROSILICATE | $20B_2O_3$—$10SiO_2$—$70ZnO$ | 8.0 | 1.53 |
| 4 | ZINC BOROSILICATE | $30B_2O_3$—$20SiO_2$—$50ZnO$ | 10.6 | 1.66 |

As can be seen in Table 2, the laminated ceramic capacitors of the examples 1 to 4, formed by using an alkali silicate glass or a phosphate glass as an inorganic binder having a Young's modulus of about $6.3 \times 10^9$ Pa or less, had high tensile strengths of 16.0 to 21.0N and had high bending strengths of 3.88 to 4.01 mm.

In contrast, the laminated ceramic capacitors of the comparative examples 1 to 4, formed by a barium borosilicate glass or a zinc borosilicate glass as an inorganic binder having a Young's modulus of approximately about $10 \times 10^9$ Pa, had tensile strengths of 8.0 to 15.0N and had bending strengths of 1.53 to 2.16 mm, and the results were inferior to those of the laminated ceramic capacitors of the examples 1 to 4.

As has thus been described, the laminated ceramic electronic device according to the present invention has a superior resistance to expansion and contraction of the circuit board and has a superior resistance to bending thereof. In particular, the laminated ceramic electronic device has an excellent mechanical strength withstanding the stress generated by bending of the circuit board caused by an external force and the stress generated by expansion and contraction of the circuit board caused by a thermal shock when mounting is performed thereon.

What is claimed is:

1. A laminated ceramic electronic device comprising:
a plurality of ceramic layers having a plurality of edges;
a plurality of internal electrodes each of which is disposed between a pair of ceramic layers; and
an external electrode connected to at least one internal electrode and comprising a conductor and an inorganic binder having a Young's modulus of about $9.0 \times 10^9$ Pa or less.

2. A laminated ceramic electronic device according to claim 1, wherein the conductor comprises a base metal.

3. A laminated ceramic electronic device according to claim 2, wherein the inorganic binder comprises at least one of an alkali silicate glass and a phosphate glass.

4. A laminated ceramic electronic device according to claim 3, wherein the glass contains substantially no alkaline earth metal oxide and no zinc oxide, and wherein the inorganic binder has a Young's modulus of about $6.3 \times 10^9$ Pa or less.

5. A laminated ceramic electronic device according to claim 4, wherein the external electrode contains about 2 to 50 parts by weight of the inorganic binder with respect to 100 parts by weight of the conductor.

6. A laminated ceramic electronic device according to claim 5, wherein an end of at least one internal electrode is exposed at an edge of the ceramic layer, and the external electrode is connected to the internal electrode at the end thereof exposed at the edge of the ceramic layer.

7. A laminated ceramic electronic device according to claim 6, wherein the laminated ceramic electronic device is a laminated ceramic capacitor.

8. A laminated ceramic electronic device according to claim 7, wherein each ceramic layer has a thickness of about 40 $\mu$m or less, each internal electrode has a thickness of about 3 $\mu$m or less, and the laminated ceramic capacitor has a thickness of about 0.15 to 2 mm.

9. A laminated ceramic electronic device according to claim 1, wherein the inorganic binder comprises at least one of an alkali silicate glass and a phosphate glass.

10. A laminated ceramic electronic device according to claim 1, wherein the inorganic binder has a Young's modulus of about $6.3 \times 10^9$ Pa or less.

11. A laminated ceramic electronic device according to claim 1, wherein the glass contains substantially no alkaline earth metal oxide and no zinc oxide.

12. A laminated ceramic electronic device according to claim 1, wherein the external electrode contains about 2 to 50 parts by weight of the inorganic binder with respect to 100 parts by weight of the conductor.

13. A laminated ceramic electronic device according to claim 1 wherein an end of at least one internal electrode is exposed at an edge of the ceramic layer, and the external electrode is connected to the internal electrode at the end thereof exposed at the edge of the ceramic layer.

14. A laminated ceramic electronic device according to claim 13, wherein the laminated ceramic electronic device is a laminated ceramic capacitor.

15. A laminated ceramic electronic device according to claim 14, wherein each ceramic layer has a thickness of about 40 $\mu$m or less, each internal electrode has a thickness of about 3 $\mu$m or less, and the laminated ceramic capacitor has a thickness of about 0.15 to 2 mm.

16. A laminated ceramic electronic device comprising:
- at least three ceramic layers disposed so as to form a body having a plurality of edge surfaces and such that there are at least two pairs of adjacent ceramic layers;
- at least two internal electrodes, each of which is disposed between a different pair of adjacent ceramic layers; and
- a pair of external electrodes, each of which is connected to a different one of the at least two internal electrodes and each of which comprises a conductor and at least one inorganic binder comprising an alkali silicate glass or a phosphate glass.

17. A laminated ceramic electronic device according to claim 16, wherein said glass has a Young's modulus of about $6.3 \times 10^9$ Pa or less.

18. A laminated ceramic electronic device according to claim 17, wherein the glass is substantially free of alkaline earth metal oxide, zinc oxide and lead.

19. A laminated ceramic electronic device according to claim 18, wherein the external electrode contains about 2 to 50 parts by weight of the glass with respect to 100 parts by weight of the conductor, and wherein the ceramic is a Ba or Pb containing titanate.

20. A laminated ceramic electronic device according to claim 19 wherein one end of each of the at least two internal electrodes is exposed at a different edge surface of the ceramic body, and the external electrodes are connected to the respective internal electrodes at the end thereof exposed at the edge surface of the ceramic body.

* * * * *